United States Patent
Lee et al.

(10) Patent No.: US 11,233,242 B2
(45) Date of Patent: Jan. 25, 2022

(54) POSITIVE ELECTRODE SLURRY COMPOSITION, AND POSITIVE ELECTRODE FOR SECONDARY BATTERY AND LITHIUM SECONDARY BATTERY WHICH INCLUDE THE COMPOSITION

(71) Applicant: LG Chem, Ltd., Seoul (KR)

(72) Inventors: Joo Sung Lee, Daejeon (KR); Yun Feng Xue, Daejeon (KR); Myung Soo Ko, Daejeon (KR); In Seong Chang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 78 days.

(21) Appl. No.: 16/481,345

(22) PCT Filed: Nov. 9, 2018

(86) PCT No.: PCT/KR2018/013632
§ 371 (c)(1),
(2) Date: Jul. 26, 2019

(87) PCT Pub. No.: WO2019/098612
PCT Pub. Date: May 23, 2019

(65) Prior Publication Data
US 2019/0393509 A1    Dec. 26, 2019

(30) Foreign Application Priority Data

Nov. 14, 2017 (KR) .................. 10-2017-0151249
Nov. 8, 2018 (KR) .................. 10-2018-0136835

(51) Int. Cl.
| | | |
|---|---|---|
| H01M 4/62 | (2006.01) | |
| C08L 27/16 | (2006.01) | |
| C08L 29/10 | (2006.01) | |
| H01M 10/0525 | (2010.01) | |
| H01M 4/02 | (2006.01) | |
| C08K 3/013 | (2018.01) | |
| C08K 3/04 | (2006.01) | |
| H01M 4/1391 | (2010.01) | |

(52) U.S. Cl.
CPC ............ *H01M 4/625* (2013.01); *C08K 3/013* (2018.01); *C08L 27/16* (2013.01); *C08L 29/10* (2013.01); *H01M 4/623* (2013.01); *H01M 10/0525* (2013.01); *C08K 3/04* (2013.01); *C08K 2201/001* (2013.01); *C08L 2201/56* (2013.01); *H01M 4/1391* (2013.01); *H01M 2004/028* (2013.01)

(58) Field of Classification Search
None
See application file for complete search history.

(56) References Cited

U.S. PATENT DOCUMENTS

| | | |
|---|---|---|
| 2001/0041290 A1 | 11/2001 | Morigaki et al. |
| 2004/0076885 A1 | 4/2004 | Sato et al. |
| 2005/0118508 A1* | 6/2005 | Yong .................... H01M 4/621 429/246 |
| 2012/0091403 A1 | 4/2012 | Okuda et al. |
| 2012/0164523 A1 | 6/2012 | Yoshikawa et al. |
| 2014/0045059 A1 | 2/2014 | He et al. |
| 2014/0127563 A1 | 5/2014 | Kim |
| 2014/0302405 A1 | 10/2014 | Sasaki et al. |
| 2016/0240854 A1 | 8/2016 | Sakurai et al. |
| 2017/0229735 A1 | 8/2017 | Ahn et al. |
| 2017/0288255 A1 | 10/2017 | Kim et al. |
| 2018/0241032 A1* | 8/2018 | Pan ....................... H01M 4/386 |
| 2019/0074538 A1 | 3/2019 | Lee et al. |

FOREIGN PATENT DOCUMENTS

| | | |
|---|---|---|
| CN | 105185959 A | 12/2015 |
| CN | 105226235 A | 1/2016 |
| CN | 105637686 A | 6/2016 |
| CN | 107078342 A | 8/2017 |
| JP | 2001-319689 A | 11/2001 |
| JP | 2004-039569 A | 2/2004 |
| JP | 2012-089312 A | 5/2012 |
| KR | 10-0373728 B1 | 2/2003 |
| KR | 10-2003-0089721 A | 11/2003 |
| KR | 10-2005-0043674 A | 5/2005 |
| KR | 10-2011-0054557 A | 5/2011 |
| KR | 10-2012-0075399 A | 7/2012 |
| KR | 10-2014-0057936 A | 5/2014 |
| KR | 10-1481993 B1 | 1/2015 |

(Continued)

OTHER PUBLICATIONS

Extended European Search Report dated Mar. 13, 2020 issued by the European Patent Office in a corresponding European patent application No. 18879733.6.

*Primary Examiner* — Sarah A. Slifka
*Assistant Examiner* — Patrick Marshall Greene
(74) *Attorney, Agent, or Firm* — Morgan, Lewis & Bockius LLP

(57) ABSTRACT

The present invention relates to a positive electrode slurry composition, and a positive electrode for a secondary battery and a lithium secondary battery which include the positive electrode slurry composition, and particularly, to a positive electrode slurry composition which includes a positive electrode active material, a fluorine-containing polymer, a conductive agent, a solvent, and a polymer or oligomer containing a unit represented by Formula 1, and a positive electrode for a lithium secondary battery and a lithium secondary battery which include the positive electrode slurry composition.

17 Claims, No Drawings

(56) References Cited

FOREIGN PATENT DOCUMENTS

| KR | 10-1666714 B1 | 10/2016 |
|---|---|---|
| KR | 10-2017-0111745 A | 10/2017 |
| KR | 10-2018-0087162 A | 8/2018 |
| KR | 10-2018-0093482 A | 8/2018 |
| WO | 2004/006363 A1 | 1/2004 |
| WO | 2013/073288 A1 | 5/2013 |

\* cited by examiner

POSITIVE ELECTRODE SLURRY COMPOSITION, AND POSITIVE ELECTRODE FOR SECONDARY BATTERY AND LITHIUM SECONDARY BATTERY WHICH INCLUDE THE COMPOSITION

CROSS-REFERENCES TO RELATED APPLICATIONS

This application is a U.S. national phase application, pursuant to 35 U.S.C. § 371, of PCT/KR2018/013632, filed Nov. 9, 2018, designating the United States, which claims priority to Korean Application No. 10-2017-0151249, filed Nov. 14, 2017, and Korean Application No. 10-2018-0136835, filed Nov. 8, 2018. The entire contents of the aforementioned patent applications are incorporated herein by this reference.

TECHNICAL FIELD

The present invention relates to a positive electrode slurry composition, and a positive electrode for a secondary battery and a lithium secondary battery which include the positive electrode slurry composition.

BACKGROUND

Recently, in line with the rapid development of electric, electronic, communication, and computer industries, demand for high performance and high stability batteries, as an essential component in these industries, has been gradually increased.

Lithium secondary batteries, specifically, lithium ion batteries (LIB), as batteries that may best meet the need, have been adopted as power sources of many portable devices due to high energy density and ease of design.

Recently, a lithium secondary battery, which may maintain excellent performance not only at room temperature but also in a more severe outside environment such as a high-temperature or low-temperature environment, is required as the range of the lithium secondary batteries used has expanded from conventional small electronic devices to large electronic devices, cars, or smart grids.

A lithium secondary battery currently used is composed of a carbon-based negative electrode capable of intercalating and deintercalating lithium ions, a positive electrode including a lithium-containing transition metal oxide, and a non-aqueous electrolyte solution in which an appropriate amount of a lithium salt is dissolved in a carbonate-based organic solvent. Charging and discharging of the lithium secondary battery is performed as lithium ions, which are discharged from the positive electrode by charging, transfer energy while a phenomenon is repeated in which the lithium ions are intercalated into the negative electrode, for example, carbon particles, and deintercalated during discharging.

Although the lithium ion battery has an advantage of high capacity, since it is unstable to thermal, mechanical and electrical shocks, there is a concern that it is ignited depending on the use environment or an exothermic phenomenon occurs to cause an explosion.

Thus, research has been emerged to prepare a lithium secondary battery in which safety is enhanced by integrating a separator and an electrode to increase adhesion between the separator and the electrode or safety is improved by suppressing an increase in interfacial resistance between the separator and the electrode.

PRIOR ART DOCUMENT

Korean Patent Application Laid-open Publication No. 2003-0089721

DISCLOSURE OF THE INVENTION

Technical Problem

An aspect of the present invention provides a positive electrode slurry composition including a polymer or oligomer which may be gelated by heat.

Another aspect of the present invention provides a positive electrode including the positive electrode slurry composition.

Another aspect of the present invention provides a lithium secondary battery including the positive electrode.

Technical Solution

According to an aspect of the present invention, there is provided a positive electrode slurry composition including:
a positive electrode active material;
a fluorine-containing polymer;
a solvent;
a conductive agent; and
a polymer or oligomer containing a unit represented by the following Formula 1.

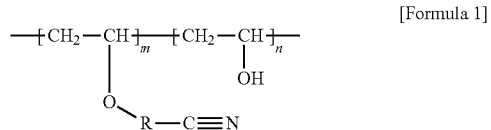

[Formula 1]

In Formula 1,
R is a substituted or unsubstituted alkylene group having 1 to 5 carbon atoms, and
m and n are the numbers of repeating units,
wherein m is an integer of 10 to 5,000, and
n is an integer of 10 to 5,000.

The fluorine-containing polymer may include at least one selected from the group consisting of polyvinylidene fluoride (PVDF), polyvinylidene fluoride-hexafluoropropylene (PVDF-HFP), and polyvinylidene fluoride-chlorotrifluoroethylene (PVDF-CTFE), and may specifically include polyvinylidene fluoride (PVDF).

The unit represented by Formula 1 may include at least one selected from the group consisting of units represented by the following Formulae 1a and 1b.

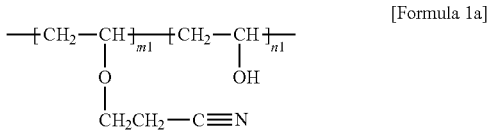

[Formula 1a]

In Formula 1a,
m1 and n1 are the numbers of repeating units,
wherein m1 is an integer of 10 to 5,000, and
n1 is an integer of 10 to 5,000.

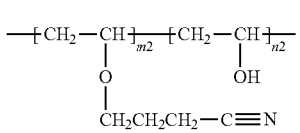

[Formula 1b]

In Formula 1b,
m2 and n2 are the numbers of repeating units,
wherein m2 is an integer of 10 to 5,000, and
n2 is an integer of 10 to 5,000.

The polymer or oligomer containing the unit represented by Formula 1 may be included in an amount of 0.2 wt % to 1.6 wt %, particularly 0.3 wt % to 1.5 wt %, and more particularly 0.3 wt % to 1.0 wt % based on a total weight of solid content in the positive electrode slurry composition.

According to another aspect of the present invention, there is provided a positive electrode for a lithium secondary battery which is prepared by using the positive electrode slurry composition of the present invention.

According to another aspect of the present invention, there is provided a lithium secondary battery including the positive electrode for a lithium secondary battery of the present invention.

In this case, a gel-type film is preferably formed on the surface of the positive electrode.

Advantageous Effects

According to the present invention, since a positive electrode slurry composition including a polymer or oligomer, which may be gelated by heat without a polymerization initiator, is provided and a positive electrode having a gel-type film formed on a surface thereof is prepared by using the positive electrode slurry composition, an interfacial resistance between the positive electrode and a separator may be suppressed and flame retardancy similar to that of a gel polymer electrolyte may be achieved without including the gel polymer electrolyte. Thus, a lithium ion battery having improved electrical (overcharge) and physical (impact) safety as well as improved high-temperature storage characteristics may be prepared.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Positive Electrode Slurry Composition

Specifically, in an embodiment of the present invention, provided is a positive electrode slurry composition including:
 a positive electrode active material;
 a fluorine-containing polymer;
 a conductive agent;
 a solvent; and
 a polymer or oligomer containing a unit represented by the following Formula 1.

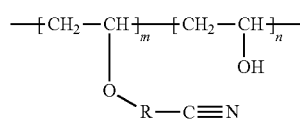

[Formula 1]

In Formula 1,
R is a substituted or unsubstituted alkylene group having 1 to 5 carbon atoms, and
m and n are the numbers of repeating units,
wherein m is an integer of 10 to 5,000, and
n is an integer of 10 to 5,000.

(1) Positive Electrode Active Material

First, the positive electrode slurry composition of the present invention may include a positive electrode active material, and the positive electrode active material is a compound capable of reversibly intercalating and deintercalating lithium, wherein the positive electrode active material may particularly include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 98 wt %, for example, 85 wt % to 90 wt % based on a total weight of solid content in the positive electrode slurry composition. In a case in which the amount of the positive electrode active material is less than 80 wt %, since energy density is reduced, capacity may be reduced.

(2) Fluorine-Containing Polymer

Also, the positive electrode slurry composition of the present invention may include a fluorine-containing polymer having oxidation stability in a high-voltage environment.

The fluorine-containing polymer is a material used as a fluorine-based binder that assists in the binding between the active material and a conductive agent and in the binding between a current collector and a positive electrode material mixture layer during the preparation of the positive electrode active material, wherein typical examples thereof may be at least one selected from the group consisting of polyvinylidene fluoride (PVDF), polyvinylidene fluoride-hexafluoropropylene (PVDF-HFP), and polyvinylidene fluoride-chlorotrifluoroethylene (PVDF-CTFE). In particular, it is desirable to use polyvinylidene fluoride (PVDF) which does not cause chemical changes due to higher stability at a high positive electrode potential.

The fluorine-containing polymer may be included in an amount of 1.0 wt % to 10 wt %, for example, 1.0 wt % to 5.0 wt % based on the total weight of the solid content in the positive electrode slurry composition.

In a case in which the amount of the fluorine-containing polymer is 1.0 wt % or greater, adhesion in the positive electrode may be stably secured, and, in a case in which the amount of the fluorine-containing polymer is 10 wt % or less, since a maximum adhesive effect may be secured within a minimum resistance increase range, charge and discharge may be stably performed.

(3) Conductive Agent

The positive electrode slurry composition of the present invention may include a conductive agent.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent having an average particle diameter ($D_{50}$) of 10 μm or less, particularly 0.01 μm to 10 and more particularly 0.01 μm to 1 μm may be used. In a case in which the average particle diameter of the conductive agent is greater than 10 since dispersibility is poor, a conductivity improvement effect due to the addition of the conductive agent may be insignificant.

In the present invention, the average particle diameter ($D_{50}$) of the conductive agent may be defined as a particle diameter at 50% in a cumulative particle diameter distribution. Also, the average particle diameter ($D_{50}$) of the conductive agent, for example, may be measured by a laser diffraction method. In particular, the conductive agent is dispersed in a solution, the solution is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may be calculated.

Also, the conductive agent having a specific surface area of 10 $m^2$/g to 500 $m^2$/g may be used. For example, in a case in which carbon powder is used as the conductive agent, the carbon powder may have a specific surface area of 40 $m^2$/g to 80 $m^2$/g, or, in a case in which graphite powder is used as the conductive agent, the graphite powder may have a specific surface area of 10 $m^2$/g to 40 $m^2$/g.

In this case, the larger the specific surface area of the conductive agent is, the larger the contact area with the positive electrode active material is, and, as a result, a conductive path may be easily formed between positive electrode active material particles. However, in a case in which the specific surface area is excessively large, particularly, in a case in which the specific surface area is greater than 500 $m^2$/g, there is a concern that energy density of the positive electrode may be reduced due to bulky structural features. In contrast, in a case in which the specific surface area of the conductive agent is excessively small, particularly, less than 10 $m^2$/g, there is a concern that the contact area with the positive electrode active material may be reduced and agglomeration of the conductive agent may occur. In the present invention, the specific surface area of the conductive agent is a value measured by a nitrogen adsorption method, i.e., a Brunauer-Emmett-Teller (BET) method. In particular, the specific surface area may be calculated from a nitrogen gas adsorption amount at a liquid nitrogen temperature (77K) using BELSORP-mini II by Bell Japan Inc.

In the positive electrode slurry composition of the present invention, the conductive agent may be a mixture which includes at least one selected from the group consisting of carbon powder and graphite powder.

In this case, a weight ratio of the carbon powder to the graphite powder may be in a range of 3:1 to 1:3, for example, 2:1 to 1:2. If the amount of the graphite power with respect to the carbon powder is greater than the above range or less than the above range, dispersibility of the slurry and battery performance may be reduced.

The conductive agent may be typically added in an amount of 10 wt % or less, particularly 0.5 wt % to 7 wt %, and more particularly 0.5 wt % to 5 wt % based on the total weight of the solid content in the positive electrode slurry composition.

In a case in which the amount of the conductive agent is 0.5 wt % or greater, the conductivity improvement effect may be secured, and, in a case in which the amount of the conductive agent is 10 wt % or less, since the amount of the active material may be maximized, capacity of the lithium secondary battery may be secured.

(4) Solvent

In the positive electrode slurry composition according to the embodiment of the present invention, the solvent may include an organic solvent such as N-methyl-2-pyrrolidone (NMP), and may be used in an amount such that desirable viscosity is obtained when the positive electrode active material, the fluorine-containing polymer, and the conductive agent are all included. For example, the solvent may be used in an amount such that the solid content of the positive electrode slurry composition including the positive electrode active material, the fluorine-containing polymer, and the conductive agent is in a range of 20 wt % to 85 wt %, for example, 30 wt % to 70 wt %.

(5) Polymer or Oligomer Containing Unit Represented by Formula 1

Furthermore, the positive electrode slurry composition of the present invention may include a polymer or oligomer containing a unit represented by Formula 1 which may be gelated by heat.

That is, since the polymer or oligomer containing a unit represented by Formula 1 contains a cyano group (CN) and a hydroxyl group (OH—) in its structure, $PF_5$ is generated while a lithium salt, for example, $LiPF_6$ present in an electrolyte solution is thermally decomposed when applying heat at a temperature of room temperature (25° C.±10° C.), for example, 40° C. or greater, specifically, 60° C. or greater, without a separate polymerization initiator, and the $PF_5$ thus generated may act as a polymerization initiator. That is, due to the $PF_5$ generated by heat, the cyano group, as a substituent contained in the polymer or oligomer containing a unit represented by Formula 1, causes cationic polymerization as shown in the following Reaction Formula 1 so that gelation may occur. When a stable gel-type film is formed on the surface of the positive electrode by such cross-linking, sufficient mechanical strength may not only be secured, but dissolution and diffusion of lithium polysulfide from the positive electrode may also be suppressed. Thus, loss of the positive electrode active material or a side reaction between the positive electrode active material and the electrolyte solution may be prevented. Furthermore, since adhesion is improved by the cross-linking of the polymer or oligomer, lifting between the surface of the positive electrode and a separator does not occur, and thus, interfacial resistance of the battery may not only be reduced, but the interfacial resistance of the battery may also be uniformly maintained.

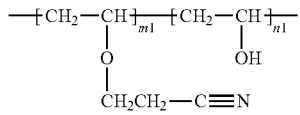

In Formula 1a, m1 and n1 are the numbers of repeating units, wherein m1 is an integer of 10 to 5,000, particularly, 50 to 3,000, and n1 is an integer of 10 to 5,000, particularly, 50 to 3,000.

[Reaction Formula 1]

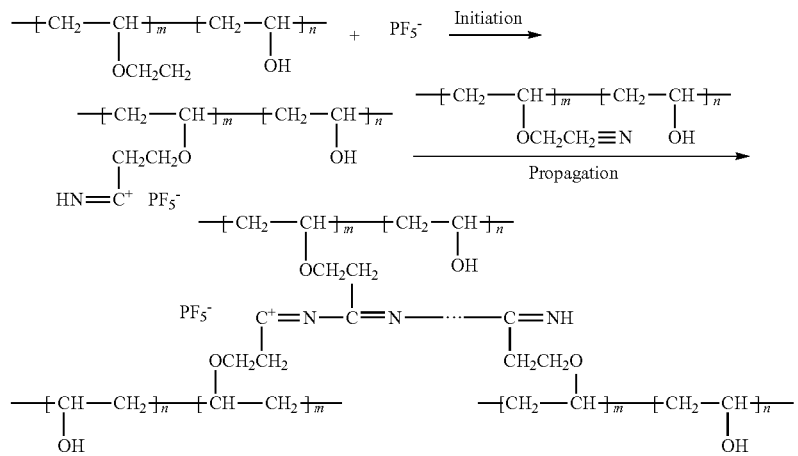

In this case, in Formula 1, a ratio of the number of repeating units n:the number of repeating units m is in a range of 1:1 to 1:5, for example, 1:1 to 1:3.

If the ratio of the number of repeating units m to the number of repeating units n is less than 1, since the amount of the repeating unit containing a hydroxyl group in the polymer or oligomer structure is relatively increased, hygroscopicity is increased to cause a side reaction, and thus, high-temperature storage characteristics may be degraded. Also, the ratio of the number of repeating units m to the number of repeating units n is greater than 5, since a cross-linking reaction rate is reduced due to an increase in the cyano group causing the cross-linking in the polymer or oligomer structure, a stable gel-type film is difficult to be formed on the surface of the positive electrode. Thus, since an effect of suppressing the interfacial resistance between the positive electrode and the separator is insignificant, an effect of improving safety against thermal, mechanical, and electrical shocks may be insignificant.

Typical examples of the unit represented by Formula 1 may be at least one selected from the group consisting of units represented by the following Formulae 1a and 1b.

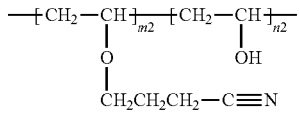

In Formula 1b, m2 and n2 are the numbers of repeating units, wherein m2 is an integer of 10 to 5,000, particularly, 50 to 3,000, and n2 is an integer of 10 to 5,000, particularly, 50 to 3,000.

In this case, in order to allow a gel to be formed by cross-linking polymerization at a temperature of 60° C. or greater, the polymer or oligomer containing a unit represented by Formula 1 may be a low molecular weight polymer or oligomer having a weight-average molecular weight (Mw) of 380,000 or less.

Specifically, the polymer or oligomer containing a unit represented by Formula 1 may have a weight-average molecular weight (Mw) of 130,000 to 380,000, for example, 190,000 to 380,000, and the weight-average molecular weight may be controlled by the number of repeating units constituting the polymer or oligomer containing a unit represented by Formula 1. In a case in which the weight-average molecular weight of the polymer or oligomer containing a unit represented by Formula 1 is within the above range, excellent gelation (cross-linking reaction) may not only be performed, but also mechanical strength of the battery may be effectively improved and pores may be appropriately maintained to achieve an effect of wetting characteristics of the electrolyte solution. In a case in which the weight-average molecular weight (Mw) of the polymer or oligomer containing a unit represented by Formula 1 is greater than 380,000, since the unreacted polymer or oligomer remains to reduce ionic conductivity of the electrolyte solution, resistance characteristics of the battery are degraded. Also, in a case in which the weight-average molecular weight is less than 130,000, since a stable gel-type film is difficult to be formed on the surface of the positive electrode, it may be difficult to secure sufficient mechanical strength.

The weight-average molecular weight of the polymer or oligomer may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

The polymer or oligomer containing a unit represented by Formula 1 may have a viscosity (DMF, 20%, 25° C.) of 130 cPs to 160 cPs, for example, 135 cPs to 155 cPs, and the viscosity may be controlled by the number of repeating units constituting the polymer or oligomer containing a unit represented by Formula 1.

In a case in which the viscosity of the polymer or oligomer containing a unit represented by Formula 1 is within the above range, electrolyte solution impregnability may be easily secured. That is, in a case in which the viscosity of the polymer or oligomer containing a unit represented by Formula 1 is 130 cPs or greater, an effect of restricting the movement of the sulfide-based compound may be achieved, and, in a case in which the viscosity of the polymer or oligomer containing a unit represented by Formula 1 is 160 cPs or less, over a predetermined range of electrolyte solution impregnability may be secured.

After the polymer or oligomer containing a unit represented by Formula 1 was dissolved in dimethylformamide (DMF) in a concentration of 20%, the viscosity was measured with a LVDV-II+Pro viscometer (cone-plate type) by Brookfield at 25° C., and, during the measurement, a spindle used was S40, the revolution per minute (rpm) of the spindle was 15, and a sample loading amount was 1 mL.

Also, the polymer or oligomer containing the unit represented by Formula 1 may be included in an amount of 0.2 wt % to 1.6 wt %, particularly 0.3 wt % to 1.5 wt %, and more particularly 0.3 wt % to 1.0 wt % based on the total weight of the solid content in the positive electrode slurry composition.

If the amount of the polymer or oligomer containing the unit represented by Formula 1 is 0.2 wt % or greater, since a gel formation effect is improved to form a stable gel-type film on the surface of the positive electrode, sufficient mechanical strength may be secured. Furthermore, since the dissolution of the lithium polysulfide during charge and discharge of the secondary battery may be effectively controlled by the stable film, an excellent safety improvement effect may be achieved. Also, if the amount of the polymer or oligomer containing the unit represented by Formula 1 is 1.6 wt %, particularly, 1.5 wt % or less, disadvantages, for example, an increase in resistance and a reduction in ionic conductivity due to the excessive amount of the polymer or oligomer may not only be prevented, but wettability of the electrolyte solution may be improved. In a case in which the amount of the polymer or oligomer containing the unit represented by Formula 1 is excessive, greater than 1.6 wt %, some uncrosslinked polymer or oligomer is partially dissolved in the electrolyte solution to reduce the wettability of the electrolyte solution while increasing the viscosity of the electrolyte solution and reduce the ionic conductivity of the electrolyte solution.

(6) Binder

Also, the positive electrode slurry composition of the present invention may further include a binder component to additionally provide adhesiveness between the current collector and a positive electrode active material layer, if necessary.

The binder component, for example, may further include at least one binder selected from the group consisting of polyimide, poly(methyl methacrylate), poly(vinyl acetate), poly(vinyl chloride), poly(vinylpyrrolidone), poly(vinyl alcohol), carboxymethyl cellulose (CMC), hydroxypropyl cellulose, regenerated cellulose, tetrafluoroethylene, polyethylene, polypropylene, an ethylene-propylene-diene monomer (EPDM), a sulfonated EPDM, a styrene-butadiene rubber, and a fluorine rubber.

The binder may be included in an amount of 30 parts by weight to 300 parts by weight based on 100 parts by weight of the fluorine-containing polymer.

In a case in which the weight ratio of the additional binder is in a range of 30 parts by weight or greater to 300 parts by weight or less, an adhesion improvement effect may not only be expected, but an equivalent level of electrode resistance may also be secured to prevent an increase in resistance.

Positive Electrode for Secondary Battery and Secondary Battery Including the Same Also, in an embodiment of the present invention, a positive electrode for a secondary battery prepared by using the positive electrode slurry composition of the present invention may be provided.

Specifically, the positive electrode for a secondary battery according to the present invention includes a positive electrode collector and a positive electrode active material layer formed on the positive electrode collector, wherein the positive electrode active material layer may be prepared by using the positive electrode slurry composition according to the present invention.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode of the present invention may be prepared according to a conventional method of preparing a positive electrode except that the positive electrode slurry composition according to the present invention may be used.

The positive electrode of the present invention may be prepared by a method including the steps of:

(a) preparing a fluorine-containing polymer solution by adding a fluorine-containing polymer to a solvent;

(b) preparing a mixed solution by adding a polymer or oligomer containing a unit represented by Formula 1 to the fluorine-containing polymer solution;

(c) preparing a positive electrode slurry composition of the present invention by adding a positive electrode active material to the mixed solution;

(d) coating a positive electrode collector with the positive electrode slurry composition; and (e) drying the positive electrode slurry composition to form a positive electrode material mixture layer on the positive electrode collector.

In this case, in the method, a conductive agent and selectively a binder may be further added in at least one step of (a) fluorine-containing polymer solution preparation step, (b) mixed solution preparation step, and (c) positive electrode slurry composition preparation step.

In this case, conventional methods may be used for the coating and the drying in the method of preparing a positive electrode according to an embodiment of the present invention.

Specifically, the coating is a process of coating the current collector with the positive electrode slurry composition in a predetermined pattern and thickness by passing the positive electrode slurry composition through a coater head. The method of coating the current collector with the positive electrode slurry composition may include a method of distributing the positive electrode slurry composition on the current collector and then uniformly dispersing the composition by using a doctor blade or the like, and methods such as die casting, comma coating, and screen printing. Also, after molding on a separate substrate, the positive electrode slurry composition may be bonded to the current collector by a pressing or lamination method.

The drying is a process of removing the solvent and moisture in the slurry to dry the slurry coated on the metal current collector, wherein, the slurry, for example, may be dried in a vacuum oven at 50° C. to 200° C. within 1 day. After the drying, a cooling process at room temperature may be further included to stabilize a positive electrode material mixture.

A rolling process may be further performed on the positive electrode after the completion of the coating.

The rolling is to increase capacity density of the positive electrode and increase adhesiveness between the current collector and the active material, wherein the positive electrode may be pressed to a desired thickness by passing the positive electrode through two rolls heated to a high temperature.

The positive electrode after the completion of the rolling process as described above may be dried in a vacuum oven at 50° C. to 200° C., as a range satisfying a temperature above a melting point of the binder, within 1 day, and may be cut to a predetermined length and then dried. After the drying, a cooling process at room temperature for stabilizing the positive electrode may be further included.

Since anions generated from the electrolyte solution are not present during the drying, the cross-linking reaction does not proceed.

The method may further include rolling after the formation of the positive electrode material mixture layer.

Also, in the present invention, a lithium secondary battery including the positive electrode for a secondary battery of the present invention may be provided.

In this case, it is desirable that a gel-type film is formed on the surface of the positive electrode active material layer of the positive electrode.

Specifically, the lithium secondary battery includes a positive electrode, a negative electrode, a separator disposed between the positive electrode and the negative electrode, and an electrolyte solution, and it is desirable that a gel-type film is additionally formed on the surface of the positive electrode.

Specifically, the lithium secondary battery according to the present invention may be prepared by the following method.

That is, the method of preparing a lithium secondary battery of the present invention may include the steps of:

(a) inserting an electrode assembly formed by sequentially stacking the positive electrode of the present invention, a separator, and a negative electrode into a battery case;

(b) injecting a non-aqueous electrolyte solution into the battery case to prepare a preliminary secondary battery;

(c) forming the preliminary secondary battery;

(d) performing a heat treatment on the preliminary secondary battery to form a gel-type film on a surface of the positive electrode; and (e) degassing to remove gas generated in the cell.

Hereinafter, each step of the present invention will be described in more detail.

(a) Step of Inserting Electrode Assembly into Battery Case

First, the method of preparing a lithium secondary battery of the present invention may include a step of preparing an electrode assembly and then inserting the electrode assembly into a battery case.

In this case, the electrode assembly is formed by sequentially stacking a positive electrode, a separator, and a negative electrode, and, since descriptions of the positive electrode used in this case overlap with those described above, the descriptions thereof will be omitted.

The negative electrode used in the preparation of the electrode assembly of the present invention may be prepared by a conventional method and used, and the negative electrode may specifically be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material includes a material capable of reversibly intercalating/deintercalating lithium ions, lithium metal, an alloy of the lithium metal, a metal composite oxide, a material which may be doped and undoped with lithium, or a transition metal oxide.

The material capable of reversibly intercalating/deintercalating lithium ions is a carbon material, wherein any carbon-based negative electrode active material generally used in a lithium ion secondary battery may be used, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the alloy of the lithium metal, an alloy of lithium and a metal selected from the group consisting of sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn) may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), copper (Cu), silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose, starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, preferably, 50 wt % to 65 wt %.

Also, the separator included in the electrode assembly plays a role in blocking an internal short circuit of both electrodes and being impregnated with the electrolyte while physically separating the electrodes, wherein any separator may be used without particular limitation as long as it is typically used as a separator in a secondary battery, and, particularly, a separator having high moisture-retention ability for an electrolyte as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present invention is not limited thereto.

The separator may be formed by preparing a separator composition by mixing a polymer resin, a filler, and a solvent, then directly coating the electrode with the separator composition, and drying the separator composition to form a separator film, or may be formed by casting the separator composition on a support, drying the separator composition, and then laminating a separator film separated from the support on the electrode.

The porous separator may generally have a pore diameter of 0.01 μm to 50 μm and a porosity of 5% to 95%. Also, the porous separator may generally have a thickness of 5 μm to 300 μm.

In the method of preparing a lithium secondary battery of the present invention, the inserting of the electrode assembly into the battery case may be performed by using a known method as disclosed in Korean Patent Application Laid-open Publication No. 2017-0111745, 2018-0087162, or 2018-0093482.

(b) Step of Injecting Non-Aqueous Electrolyte Solution to Prepare Preliminary Secondary Battery The non-aqueous electrolyte solution used during the preparation of the lithium secondary battery of the present invention includes a lithium salt and a non-aqueous organic solvent, wherein the lithium salt may be used without particular limitation as long as it is a compound capable of providing lithium ions used in a secondary battery as well as the lithium secondary battery, and, as a representative example, the lithium salt may include Li as a cation, and may include at least one selected from the group consisting of $F^-$, $Cl^-$, $Br^-$, $I^-$, $NO_3^-$, $N(CN)_2^-$, $ClO_4^-$, $BF_4^-$, $AlO_4^-$, $AlCl_4^-$, $PF_6^-$, $SbF_6^-$, $AsF_6^-$, $BF_2C_2O_4^-$, $BC_4O_8^-$, $PO_2F_2^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

The lithium salt may be included in a concentration of 0.6 M to 2 M in the electrolyte. In a case in which the concentration of the lithium salt is less than 0.6 M, since conductivity of the electrolyte is reduced, electrolyte performance is degraded, and, in a case in which the concentration of the lithium salt is greater than 2 M, since viscosity of the electrolyte is increased, mobility of lithium ions may be reduced.

Also, the organic solvent is not limited as long as it may minimize decomposition due to an oxidation reaction during charge and discharge of the secondary battery and may exhibit desired characteristics with an additive.

The organic solvent may include at least one organic solvent selected from the group consisting of a cyclic carbonate-based organic solvent, a linear carbonate-based organic solvent, a linear ester-based organic solvent, and a cyclic ester-based organic solvent.

Specifically, the organic solvent may include a cyclic carbonate-based organic solvent and a linear carbonate-based organic solvent.

Specific examples of the cyclic carbonate-based organic solvent may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, or a mixture of two or more thereof, and, among them, the cyclic carbonate-based organic solvent may include ethylene carbonate which well dissociates the lithium salt in the electrolyte due to high permittivity as a highly viscous organic solvent.

Also, specific examples of the linear carbonate-based organic solvent having low viscosity and low permittivity may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

Furthermore, the organic solvent may further include the linear ester-based organic solvent and/or cyclic ester-based organic solvent to prepare an electrolyte solution having high electrical conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate. Also, the cyclic ester-based organic solvent may include at least one organic solvent selected from the group consisting of γ-butyrolactone, γ-valerolactone, γ-caprolactone, σ-valerolactone, and ε-caprolactone.

The organic solvent may be used by adding an organic solvent typically used in an electrolyte solution for a lithium secondary battery without limitation, if necessary. For example, the organic solvent may include at least one organic solvent of an ether-based organic solvent and a nitrile-based organic solvent.

The ether-based organic solvent may include any one selected from the group consisting of dimethyl ether, diethyl ether, dipropyl ether, methylethyl ether, methylpropyl ether, and ethylpropyl ether or a mixture of two or more thereof, but the present invention is not limited thereto.

The nitrile-based organic solvent, for example, may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenyl acetonitrile, and 4-fluorophenylacetonitrile.

In the method of preparing a lithium secondary battery of the present invention, the injecting of the non-aqueous electrolyte solution may be performed by using a known method as disclosed in Korean Patent Application Laid-open Publication No. 2017-0111745, 2018-0087162, or 2018-0093482.

(c) Step of Forming the Preliminary Secondary Battery

A step of forming the cell is a step of forming a solid electrolyte interface (SEI) on the surface of the negative electrode by partially performing charge and discharge, wherein it may be performed by a method known in the art as disclosed in Korean Patent Application Laid-open Publication No. 2017-0111745, 2018-0087162, or 2018-0093482, and, for example, may be performed by performing charge and discharge once or repeatedly within a predetermined range of constant current or constant voltage. Specifically, the formation of the cell may be performed by performing charge and discharge once or repeatedly to a state of charge (SOC) of 30% to 100%, for example, a SOC of 30% to 70% in a voltage range of 2.5 V to 4.8 V at a temperature of 25° C. to 70° C., for example, 25° C. to 65° C.

(d) Step of Forming Gel-Type Film on Surface of the Positive Electrode

In the present invention, the performing of the heat treatment on the cell for forming a gel-type film on the surface of the positive electrode may be performed by performing a thermal polymerization process in a temperature range of 60° C. to 100° C., for example, 60° C. to 80° C., for 30 minutes to 12 hours, for example, 2 hours to 12 hours under an inert condition.

In a case in which the heat treatment is performed at a temperature of less than 60° C. or is performed for less than 2 minutes, since a residue of the uncrosslinked polymer or oligomer containing a unit represented by Formula 1 is present in the form of being dissolved in the electrolyte solution, it may reduce ionic conductivity by increasing the viscosity of the electrolyte solution. Also, in a case in which the heat treatment is performed at a temperature of greater than 100° C. or is performed for greater than 12 hours, a side reaction of the electrolyte solution with the polymer or oligomer containing a unit represented by Formula 1 may not only occur, but also the battery performance may be degraded due to the high temperature.

Furthermore, the method of the present invention may further include a step of aging at 25° C. to 70° C., for example, 30° C. to 60° C., for 1 hour to 24 hours, after the performing of the heat treatment.

In the aging, an additional SEI may be formed by allowing the battery after the completion of the charge and discharge and curing process to be left standing for a predetermined period of time at room temperature, and, accordingly, additional gas generation may be induced.

(e) Step of Degassing to Remove Gas Generated in the Cell

Also, in the present invention, a step of degassing to remove gas generated in the cell may be further included after the aging.

A shape of the lithium secondary battery of the present invention is not particularly limited, but the lithium secondary battery may have various shapes, such as a cylindrical shape, a prismatic shape, a pouch shape, or a coin shape, depending on purposes. The lithium secondary battery according to the embodiment of the present invention may be a pouch type lithium secondary battery.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Positive Electrode Preparation)

1.2 g of polyvinylidene fluoride (PVDF), as a fluorine-containing polymer, was added to 30 g of N-methyl-2-pyrrolidone (NMP) to prepare a fluorine-containing polymer solution.

Subsequently, 0.5 g of an oligomer containing the unit represented by Formula 1a (weight-average molecular weight: 230,000, m1:n1=5:2) was added to the fluorine-containing polymer solution to prepare a mixed solution.

97.3 g of a positive electrode active material ($LiCoO_2$) and 1.0 g of carbon black, as a conductive agent, were added to the mixed solution to prepare a positive electrode slurry composition (solid content of 65 wt %).

Subsequently, a 10 μm thick positive electrode collector (Al foil) was coated with the positive electrode active slurry composition, dried, and roll-pressed to prepare a positive electrode.

(Negative Electrode Preparation)

Artificial graphite as a negative electrode active material, carbon black as a conductive agent, and a binder (SBR:CMC-Na=weight ratio of 2:1) were mixed in a weight ratio of 96.5:0.5:3 and then added to water, as a solvent, to prepare a negative electrode mixture slurry having a solid content of 95 wt %. An 8 μm thick copper (Cu) thin film, as a negative electrode collector, was coated with the negative electrode mixture slurry, dried, and roll-pressed to prepare a negative electrode.

(Secondary Battery Preparation)

An electrode assembly was prepared by disposing a polyethylene-based separator (material thickness: 7 coating thickness: 5 μm) between the prepared positive electrode and negative electrode, the electrode assembly was accommodated in a pouch-type battery case, and a liquid electrolyte solution, in which 1.2 M $LiPF_6$ was dissolved in an organic solvent (EC/PC/PP=volume ratio of 35:10:55), was injected thereinto to prepare a secondary battery.

Subsequently, after formation was performed by charging the secondary battery to a SOC of 30% at 1 C for 3 hours to a voltage of 3 V at 65° C., aging was performed at 30° C. for 24 hours.

Next, a heat treatment was performed at 60° C. for 10 hours to prepare a secondary battery in which a gel-type film was formed on the surface of the positive electrode.

Subsequently, after a degassing process was performed at a pressure of −95 kPa, aging was performed at 25° C. for 2 days and at 60° C. for 1 day, and a degassing process was then performed again at a pressure of −95 kPa.

Subsequently, the secondary battery was charged at a constant current of ⅓ C to 4.15 V and discharged to 3 V to complete a pouch type lithium secondary battery.

Example 2

A positive electrode and a secondary battery including the same were prepared in the same manner as in Example 1 except that 0.3 g of the oligomer containing the unit represented by Formula 1a (weight-average molecular weight: 230,000, m1:n1=5:2) was added and 97.5 g of the positive electrode active material was added.

Example 3

A positive electrode and a secondary battery including the same were prepared in the same manner as in Example 1 except that an oligomer containing the unit represented by Formula 1b (weight-average molecular weight: 260,000, m2:n2=5:2) was used instead of the oligomer containing the unit represented by Formula 1a.

Example 4

A positive electrode and a secondary battery including the same were prepared in the same manner as in Example 2 except that the oligomer containing the unit represented by Formula 1b (weight-average molecular weight: 260,000, m2:n2=5:2) was used instead of the oligomer containing the unit represented by Formula 1a.

Example 5

A positive electrode and a secondary battery including the same were prepared in the same manner as in Example 1 except that 1.0 g of the oligomer containing the unit represented by Formula 1a, 2 g of the fluorine-containing polymer (PVDF), and 96 g of the positive electrode active material were added.

Example 6

A positive electrode and a secondary battery including the same were prepared in the same manner as in Example 1 except that 1.5 g of the oligomer containing the unit represented by Formula 1a was added and 96.3 g of the positive electrode active material was added.

Example 7

A positive electrode and a secondary battery including the same were prepared in the same manner as in Example 1 except that 1.7 g of the oligomer containing the unit represented by Formula 1a was added and 96.1 g of the positive electrode active material was added.

Example 8

A positive electrode and a secondary battery including the same were prepared in the same manner as in Example 1 except that 3.5 g of the oligomer containing the unit represented by Formula 1b was added and 94.3 g of the positive electrode active material was added.

Comparative Example 1

A positive electrode and a secondary battery including the same were prepared in the same manner as in Example 1 except that the oligomer containing the unit represented by Formula 1a, as an additive, was not included, and the positive electrode active material, the conductive agent, and the fluorine-containing polymer (PVDF) were included in a weight ratio of 97.3:1.0:1.7.

Comparative Example 2

(Positive Electrode Preparation)

2.0 g of polyvinylidene fluoride (PVDF), as a fluorine-containing polymer, was added to N-methyl-2-pyrrolidone (NMP) to prepare a fluorine-containing polymer solution.

Subsequently, 97 g of a positive electrode active material ($LiCoO_2$) and 1.0 g of carbon black, as a conductive agent, were added to the fluorine-containing polymer solution to prepare a positive electrode slurry composition (solid content of 65 wt %).

Subsequently, a 10 µm thick positive electrode collector (Al foil) was coated with the positive electrode active slurry composition, dried, and roll-pressed to prepare a positive electrode.

(Negative Electrode Preparation)

3.0 g of polyvinylidene fluoride (PVDF), as a fluorine-containing polymer, was added to N-methyl-2-pyrrolidone (NMP) to prepare a fluorine-containing polymer solution.

Subsequently, 0.5 g of the oligomer containing the unit represented by Formula 1a (weight-average molecular weight: 230,000, m1:n1=5:2) was added to the fluorine-containing polymer solution to prepare a mixed solution.

96 g of artificial graphite and 0.5 g of carbon black, as a conductive agent, were added to the mixed solution to prepare a negative electrode slurry composition (solid content of 65 wt %).

Subsequently, an 8 µm thick copper (Cu) thin film, as a negative electrode collector, was coated with the negative electrode slurry composition, dried, and roll-pressed to prepare a negative electrode.

(Secondary Battery Preparation)

A secondary battery was prepared in the same manner as in Example 1 except that the prepared positive electrode and negative electrode were used to prepare an electrode assembly.

EXPERIMENTAL EXAMPLES

Experimental Example 1

Overcharge safety evaluation tests were performed on the lithium secondary batteries prepared in Examples 1 to 8 and Comparative Examples 1 and 2 in accordance with the PSE standard (charge to 10 V at an external temperature of 55° C.) to evaluate the occurrence of ignition during overcharge. The results thereof are presented in Table 1 below.

Experimental Example 2

After the lithium secondary batteries prepared in Examples 1 to 8 and Comparative Examples 1 and 2 were fully charged at a voltage of 4.45 V, the occurrence of ignition was evaluated after performing a drop test of UL1642 standard, that is, an impact test by dropping each secondary battery at 1.9 m three times for checking the stability of each secondary battery. The results thereof are presented in Table 1 below.

Experimental Example 3

Initial charge and discharge were performed by fully charging the lithium secondary batteries prepared in Examples 1 to 8 and Comparative Examples 1 and 2 at constant current-constant voltage of 0.33 C/4.2 V and discharged at 5 C for 10 seconds at a SOC of 50%. Thereafter, an initial thickness of each lithium secondary battery was measured with a vernier caliper (Mitutoyo, Japan).

Subsequently, each of the lithium secondary batteries subject to the initial charge and discharge was charged at 4.2 V to a SOC of 100% and stored at 70° C. for 24 hours. After 24 hours, a thickness after high-temperature storage was measured using the vernier caliper (Mitutoyo (Japan)).

Subsequently, a thickness increase rate was calculated by substituting the initial thickness and thickness after high-temperature storage measured as described above into the following Equation (1), and the results thereof are listed in Tables 1 below.

thickness increase rate (%)={(thickness after high-temperature storage−initial thickness)/initial thickness}×100   Equation (1):

Experimental Example 4

Each of the lithium secondary batteries prepared in Examples 1 to 8 was charged at a constant current of 0.2 C to 4.2 V at 25° C., was left standing for 10 minutes, and then discharged at a constant current of 0.2 C to 3.0 V. The above charging and discharging were set as one cycle, and discharge capacity after the first cycle was measured using PNE-0506 charge/discharge equipment (manufacturer: PNE SOLUTION Co., Ltd., 5 V, 6 A). The results thereof are listed in Table 1 below.

TABLE 1

|  |  | Example 1 | Example 2 | Example 3 | Example 4 | Example 5 | Example 6 | Example 7 | Example 8 | Comparative Example 1 | Comparative Example 2 |
| --- | --- | --- | --- | --- | --- | --- | --- | --- | --- | --- | --- |
| Positive Electrode | Positive electrode active material (g) | 97.3 | 97.5 | 97.3 | 97.5 | 96 | 96.3 | 96.1 | 94.3 | 97.3 | 97 |
|  | Conductive agent (g) | 1.0 | 1.0 | 1.0 | 1.0 | 1.0 | 1.0 | 1.0 | 1.0 | 1.0 | 1.0 |
|  | Flourine-containing polymer (g) | 1.2 | 1.2 | 1.2 | 1.2 | 2.0 | 1.2 | 1.2 | 1.2 | 1.7 | 2.0 |

TABLE 1-continued

|  |  | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
|  | Polymer or oligomer (g) | (Formula) 0.5 | (Formula) 0.3 | (Formula) 0.5 | (Formula) 0.3 | (Formula) 1.0 | (Formula) 1.5 | (Formula) 1.7 | (Formula) 3.5 | — | — |
|  | Total content | 100 | 100 | 100 | 100 | 100 | 100 | 100 | 100 | 100 | 100 |
| Negative Electrode | Negative electrode active material (g) | 96.5 | 96.5 | 96.5 | 96.5 | 96.5 | 96.5 | 96.5 | 96.5 | 96.5 | 96 |
|  | Conductive agent (g) | 0.5 | 0.5 | 0.5 | 0.5 | 0.5 | 0.5 | 0.5 | 0.5 | 0.5 | 0.5 |
|  | Binder (g) | 3 | 3 | 3 | 3 | 3 | 3 | 3 | 3 | 3 | — |
|  | Flourine-containing polymer (g) | — | — | — | — | — | — | — | — | — | 3 |
|  | Polymer (g) | — | — | — | — | — | — | — | — | — | (Formula) 0.5 |
|  | Total content | 100 | 100 | 100 | 100 | 100 | 100 | 100 | 100 | 100 | 100 |
| Occurrence of overcharge ignition |  | X | X | X | X | X | X | X | X | ○ | ○ |
| Occurrence of ignition after impact test |  | X | X | X | X | X | X | X | X | ○ | ○ |
| Thickness increase rate after high-temperature storage (%) |  | 5.8 | 7.1 | 5.9 | 6.2 | 5.4 | 5.2 | 4.9 | 4.3 | 12.2 | 11.9 |
| Discharge capacity (mAh/g) |  | 3512 | 3520 | 3508 | 3515 | 3495 | 3475 | 3469 | 3403 | — | — |

In Table 1, X denotes that ignition did not occur during overcharge, and O denotes that ignition occurred during overcharge.

Referring to Table 1, the secondary batteries prepared in Examples 1 to 8 of the present invention were not ignited during the overcharge or after the impact test, but, with respect to the secondary batteries of Comparative Examples 1 and 2 which included the positive electrodes prepared by using the positive electrode slurry compositions without the oligomer containing the unit represented by Formula 1, it may be understood that continuous ignition occurred during the overcharge or after the impact test. That is, since gas was generated due to the side reaction between the positive electrode and the electrolyte solution during the overcharge to cause ignition, it may be understood that ignition occurred even in the lithium secondary battery of Comparative Example 2 including the negative electrode which included the oligomer containing the unit represented by Formula 1.

Also, referring to Table 1, it may be understood that the secondary batteries prepared in Examples 1 to 8 of the present invention had thickness increase rates (%) after high-temperature storage of about 8.8% or less, but, with respect to the secondary batteries of Comparative Examples 1 and 2 respectively including the positive electrodes prepared by using the positive electrode slurry compositions without the oligomer containing the unit represented by Formula 1, thickness increase rates (%) after high-temperature storage were significantly increased to 12.2% and 11.9%, respectively.

In this case, with respect to the secondary batteries of Examples 7 and 8, since the gel-type film was excessively formed on the surface of the positive electrode by including the excessive amount of the oligomer containing the unit represented by Formula 1, it may be understood that the thickness increase rates were the lowest and ignition did not occur during the overcharge or after the impact test.

Referring to Table 1, it may be understood that discharge capacities of the secondary batteries prepared in Examples 1 to 6 under the same condition were about 3475 mAh/g or greater.

In contrast, discharge capacities of the secondary batteries of Examples 7 and 8 respectively including the positive electrodes prepared by using the positive electrode slurry compositions including the excessive amount of the oligomer containing the unit represented by Formula 1 were 3469 mAh/g and 3403 mAh/g, respectively, wherein it may be understood that these values were less than those of the secondary batteries prepared in Examples 1 to 6.

That is, with respect to the secondary batteries of Examples 7 and 8, since the amount of the positive electrode active material was relatively reduced by including the excessive amount of the oligomer containing the unit represented by Formula 1, the secondary batteries of Examples 7 and 8 did not exhibit energy densities as much as those of the lithium secondary batteries of Examples 1 to 6, and thus, it was predicted that the discharge capacities were less than those of the secondary batteries of Examples 1 to 6.

The invention claimed is:

1. A positive electrode slurry composition comprising:
   a positive electrode active material; a fluorine-containing polymer; a conductive agent; a solvent; and
   a polymer or oligomer containing a unit represented by Formula 1:

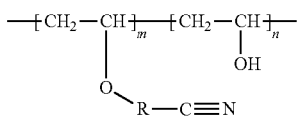

wherein, in Formula 1,
R is a substituted or unsubstituted alkylene group having 1 to 5 carbon atoms, and
m and n are the numbers of repeating units,
wherein m is an integer of 10 to 5,000, and
n is an integer of 10 to 5,000,
wherein the polymer or oligomer containing the unit represented by Formula 1 is included in an amount of 0.2 wt % to 1.6 wt % based on a total weight of solid content in the positive electrode slurry composition.

2. The positive electrode slurry composition of claim 1, wherein the fluorine-containing polymer comprises at least one selected from the group consisting of polyvinylidene fluoride (PVDF), polyvinylidene fluoride-hexafluoropropylene (PVDF-HFP), and polyvinylidene fluoride-chlorotrifluoroethylene (PVDF-CTFE).

3. The positive electrode slurry composition of claim 1, wherein the fluorine-containing polymer is polyvinylidene fluoride.

4. The positive electrode slurry composition of claim 1, wherein the unit represented by Formula 1 comprises a unit represented by Formula 1a:

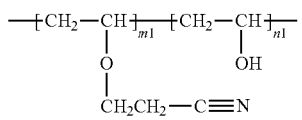

wherein, in Formula 1a,
m1 and n1 are the numbers of repeating units,
wherein m1 is an integer of 10 to 5,000, and
n1 is an integer of 10 to 5,000.

5. The positive electrode slurry composition of claim 1, wherein the polymer or oligomer containing the unit represented by Formula 1 is included in an amount of 0.3 wt % to 1.5 wt % based on a total weight of solid content in the positive electrode slurry composition.

6. The positive electrode slurry composition of claim 1, wherein the polymer or oligomer containing the unit represented by Formula 1 is included in an amount of 0.3 wt % to 1.0 wt % based on a total weight of solid content in the positive electrode slurry composition.

7. A positive electrode for a lithium secondary battery which is prepared by using the positive electrode slurry composition of claim 1.

8. A lithium secondary battery comprising the positive electrode for a lithium secondary battery of claim 7.

9. The lithium secondary battery of claim 8, wherein a gel-type film is formed on a surface of the positive electrode for a lithium secondary battery.

10. The positive electrode slurry composition of claim 1, wherein a weight-average molecular weight (Mw) of the polymer or the oligomer containing a unit represented by Formula 1 is 130,000 to 380,000.

11. The positive electrode slurry composition of claim 1, wherein a weight-average molecular weight (Mw) of the polymer or the oligomer containing a unit represented by Formula 1 is 190,000 to 380,000.

12. The positive electrode slurry composition of claim 1, wherein a ratio of the numbers of repeating unit n:the numbers of repeating unit m is in a range of 1:1 to 1:5.

13. The positive electrode slurry composition of claim 1, wherein a ratio of the numbers of repeating unit n:the numbers of repeating unit m is in a range of 1:1 to 1:3.

14. The positive electrode slurry composition of claim 1, wherein the positive electrode active material comprises a lithium composite metal oxide selected from the group consisting of $LiMnO_2$, $LiMn_2O_4$, $LiCoO_2$, $LiNiO_2$, $LiNi_{1-Y}Mn_YO_2$ (0<Y<1), $LiMn_{2-Z}Ni_ZO_4$ (0<Z<2), $LiNi_{1-Y1}Co_{Y1}O_2$ (0<Y1<1), $LiCo_{1-Y2}Mn_{Y2}O_2$ (0<Y2<1), $LiMn_{2-Z1}Co_{Z1}O_4$(0<Z1<2), $Li(Ni_pCo_qMn_{r1})O_2$(0<p<1, 0<q<1, 0<r1<1, and p+q+r1=1), $Li(Ni_{p1}Co_{q1}Mn_{r2})O_4$ (0<p1<2, 0<q1<2, 0<r2<2, and p1+q1+r2=2), and $Li(Ni_{p2}Co_{q2}Mn_{r3}M_{S2})O_2$.

15. The positive electrode slurry composition of claim 1, wherein the conductive agent comprises a conductive material selected from the group consisting of carbon powder, graphite powder, conductive fibers, metal powder, conductive whiskers, conductive metal oxide, and polyphenylene derivatives.

16. The positive electrode slurry composition of claim 1, wherein the solvent comprises N-methyl-2-pyrrolidone (NMP).

17. The positive electrode slurry composition of claim 1, wherein the unit represented by Formula 1 comprises a unit represented by Formula 1b:

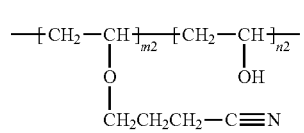

wherein, in Formula 1b,
m2 and n2 are the numbers of repeating units,
wherein m2 is an integer of 10 to 5,000, and
n2 is an integer of 10 to 5,000.

* * * * *